ALKYL CHLOROPHENYLPOLYSILOXANE WATER-REPELLENT COMPOSITIONS

Donald V. Brown, Edgar D. Brown, Jr., and Herbert J. Leavitt, Schenectady, N.Y., assignors to General Electric Company, a corporation of New York No Drawing. Application May 13, 1957
Serial No. 658,497

12 Claims. (Cl. 260—28)

This invention relates to water-repellent organopolysiloxanes useful in rendering various porous materials water-repellent without the necessity of using heat to bring out the optimum water-repellency of the treated surface. More particularly, the invention relates to a composition of matter comprising, by weight, (1) from 10 to 60 percent of a titanium compound selected from the class consisting of (a) orthotitanates having the general formula $Ti(OR)_4$ where R is a member selected from the class consisting of aliphatic hydrocarbon radicals of less than twelve carbon atoms and hydroxylated and aminated aliphatic hydrocarbon radicals of less than twelve carbon atoms and containing less than four hydroxy radicals, and (b) aliphatic hydrocarbon-soluble partial hydrolyzates of (a), (2) from 25 to 75 percent of a methylpolysiloxane copolymer containing trimethylsiloxy units and $SiO_2$ units wherein said units are in such proportion that the ratio of methyl groups to silicon atoms ranges from about 1 to 1.25 methyl groups per silicon atom, and (3) from 10 to 50 percent of a fluid organopolysiloxane having the formula

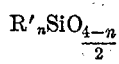

$$R'_n SiO_{\frac{4-n}{2}}$$

where R' represents both a lower alkyl radical (e.g., methyl and ethyl radicals) and chlorinated phenyl radicals in which the chlorinated phenyl radicals contain an average of from 3 to 5 chlorine atoms per phenyl nucleus, and the chlorinated phenyl radicals constitute from 5 to 25 percent of the total number of lower alkyl and chlorophenyl radicals, and $n$ has an average value above 1.96 but below 2.5, the lower alkyl chlorophenylpolysiloxane fluid having a viscosity of from 10 to 100,000 centistokes, e.g., from 15 to 5,000 centistokes, when measured at 25° C.

Various means have been employed in the past to impart water-repellency to textiles employing organopolysiloxanes for the purpose. This treatment has usually involved using methyl hydrogen polysiloxanes, together with catalysts such as lead octoate, tin naphthenate, etc. which convert these methyl hydrogen polysiloxanes to the cross-linked state. In general, such conversion requires the application of elevated temperatures, for instance, from 150 to 200° C. for varying lengths of time in order to obtain an optimum degree of water-repellency. The use of methyl hydrogen polysiloxanes for this purpose is disclosed in such patents as, for instance, Dennett 2,588,366 and Rasmussen 2,612,482.

The type of applications described above have been generally successful on a commercial scale when employed in textile mills during fabric finishing operations. However, this technology is not applicable to a consumer product application because the methyl hydrogen polysiloxane is usually not stable for a sufficient length of time in the presence of catalysts to render it usable on a small scale home use. Moreover, the requirement of a heating cycle to bring out the optimum cure and water-repellency is obviously not practical for home applications because of the lack of adequate facilities, including means for applying the water-repellent.

We have now discovered that a specific combination of ingredients composed of a mixture of the aforesaid organotitanate, a methylpolysiloxane polymer, and a methylchlorophenylpolysiloxane polymer can be readily applied to porous surfaces, particularly textile surfaces, such as cotton, by convenient means, such as from the aerosol pressure container, and the treated surface is readily converted to a highly water-repellent state without the necessity of using heat to bring out the optimum degree of water-repellency. Moreover, the mixture of ingredients used is stable indefinitely, and requires no special precautions in handling or in storage as do the methyl hydrogen polysiloxanes which tend to release hydrogen on standing.

We are aware that U.S. Patent 2,672,455, Currie, issued March 16, 1954, discloses, for the purpose of rendering leather water-repellent, a mixture of ingredients comprising a titanate, a methylpolysiloxane copolymer composed of trimethylsiloxy units and $SiO_2$ units, and an organopolysiloxane containing from 2 to 2.9 organic groups per silicon atom in which the organic radicals are selected from the class consisting of alkyl radicals, alkenyl radicals and monocyclic aryl radicals, i.e., hydrocarbon radicals of the aryl type which are free of substitution. However, we have found that methylpolysiloxane compositions, such as those disclosed and claimed in the aforesaid Currie patent, when applied to textiles, for instance, cotton, fail to give any evidence of satisfactory water-repellency on the cotton, and in most cases the spray rating using such polysiloxane materials is zero. Even if the organopolysiloxanes described in this patent contain both methyl groups and unsubstituted phenyl groups, the spray rating, for instance, on cotton, is erratic and much lower than the spray ratings obtainable by using our compositions.

It is, therefore, one of the objects of this invention to obtain good water-repellency on textiles without requiring elaborate means of application of the water-repellent.

It is another object of the invention to render textile surfaces, such as cotton, rayon, acetate, nylon, etc., water-repellent by convenient means without requiring heat to bring out the optimum water-repellency.

It is a still further object of the invention to render surfaces of garments water-repellent by means of convenient containers capable of being economically and practically used at home without requiring complicated equipment or specialized conditions for application.

Other objects of the invention will become more apparent from the following description thereof.

All the foregoing objects and desirable results are attained by employing in the water-repellent treating composition a mixture of ingredients in certain proportions comprising the aforesaid organotitanate, the methylpolysiloxane copolymer composed of trimethylsiloxy units and $SiO_2$ units, and a methyl chlorophenylpolysiloxane more particularly described above. This mixture of ingredients is conveniently applied from an aerosol container from which the water-repellent composition is expelled onto the surface it is desired to treat by means of gaseous propellants in the form of a mist or spray of fine particles, wherein the propellant is a liquefied gas having a vapor pressure at room temperature (27° C.) sufficiently high to vaporize rapidly at room temperature and to propel the water-repellent composition onto the surface being rendered water-repellent.

The methylpolysiloxane resinous copolymer containing trimethylsiloxy units and $SiO_2$ units (hereinafter referred to as "methylpolysiloxane copolymer") may be prepared by various means. One method comprises cohydrolyzing a compound having the formula $(CH_3)_3SiX$ and with a compound having the formula $SiX_4$, where X is a hydrolyzable radical, e.g., chlorine, bromine, fluorine, alkoxy (e.g., methoxy, ethoxy, etc.) radicals, acyloxy radicals, etc., employing such proportions of ingredients as are necessary to obtain the desired methyl/Si ratio of from 1 to 1.25 methyl groups per silicon atom. Instead of employing with the trimethyl hydrolyzable silane, monomeric tetrahydrolyzable silanes of the formula $SiX_4$ mentioned before, one can also employ polymeric alkyl silicates derived from controlled hydrolysis of the monomeric orthosilicate, wherein the polymeric alkyl silicate composition contains some silicon-bonded hydroxy groups.

The methylpolysiloxane copolymer is advantageously prepared by effecting cohydrolysis of the trialkyl hydrolyzable silane and an alkyl silicate (this designation for the silicate is intended hereinafter to include both the monomeric and polymeric forms of the alkyl silicate) by adding the trialkyl hydrolyzable silane and the alkyl silicate to a suitable solvent, such as toluene, benzene, xylene, etc., and thereafter adding the solution of the ingredients to a sufficient amount of water to effect the desired hydrolysis and co-condensation in a suitably acidic medium. The choice of the solvent will depend on such considerations as, for instance, the particular trialkyl hydrolyzable silane and alkyl silicate used, the relative proportions of the ingredients, the effect of the solvent on processing the hydrolysis and co-condensation product, etc. In this respect, water-miscible solvents such as alcohols, ketones, esters, etc., should be avoided since these materials do not effect adequate separation between the hydrolysis product and the water of hydrolysis so as to give satisfactory recovery of the reaction product of the trialkyl hydrolyzable silane and the alkyl silicate. The amount of solvent used may be varied widely but advantageously, by weight, it is within the range of from about 0.25 to 2 parts solvent per part of cohydrolyzate, that is, the trialkyl hydrolyzable silane and the alkyl silicate.

The amount of water used for hydrolysis purposes is generally not critical and may be varied within wide ranges. The minimum amount of water required is that necessary to hydrolyze all the silicon-bonded hydrolyzable groups in the trialkyl hydrolyzable silane and all the alkoxy groups in the alkyl silicate. The maximum amount of water will generally be determined by the ease with which the cohydrolyzate can be processed to isolate the cohydrolysis product or resin. The amount of water used should be at least from 2 to 3 mols water per total molar concentration of the trialkyl hydrolyzable silane and the alkyl silicate. In general, the amount of water used should be as low as possible to assist in good yields of the methylpolysiloxane copolymer resin, while utilizing to the fullest extent the space available in equipment used for hydrolysis purposes. An upper range of water which may be used with satisfactory results is that of the order of about 40 to 50 mols per mol of the mixture of trialkyl hydrolyzable silane and alkyl silicate. For each mol of the trialkyl hydrolyzable silane, we preferably use from 1 to 2 mols of the alkyl silicate, advantageously within the range of from about 1.2 to 1.8 mols of the alkyl silicate per mol of trialkyl hydrolyzable silane. In the preparation of the resin, one may add up to 25 percent, by weight, preferably from 3 to 15 percent, by weight, based on the weight of the trialkyl hydrolyzable silane, of other cohydrolyzable materials, such as dimethyldiethoxysilane, dimethyldichlorosilane, diphenyldichlorosilane, methyl phenyldichlorosilane, methyltrichlorosilane, etc., to give difunctional or trifunctional siloxy units of the formula $(R'')_2SiO$ and $R''SiO_{3/2}$ where $R''$ is a monovalent hydrocarbon radical, e.g., methyl, ethyl, butyl, decyl, phenyl, benzyl, etc., radical. However, satisfactory properties in the material are often realized without these additional difunctional or trifunctional units and may be omitted if desired.

In preparing the resin, the trialkyl hydrolyzable silane and alkyl silicate are dissolved in a suitable solvent, and added with stirring to the water of hydrolysis, advantageously using temperatures of from 60° C. to 85° C. Thereafter, the two-phase system thus obtained is processed to remove the water-alcohol layer and the remaining resinous material is neutralized with a sufficient amount of sodium bicarbonate or other alkaline material to give the resin a pH of at least about 6 or 7. Thereafter, the resin is filtered and advantageously adjusted to a resinous solids content of about 30 to 65 percent, using, where necessary, additional amounts of solvent such as toluene, xylene, etc., in order to avoid premature gelation of the resin and to maintain its stability for a time sufficient to permit its use with the other ingredients.

The presence of dimethylsiloxy units of the formula

intercondensed with the methylpolysiloxane copolymer is not precluded. Thus, in addition to trimethylsiloxy units and $SiO_2$ units, one can have intercondensed dimethylsiloxy units which can be obtained by cohydrolyzing trimethylchlorosilane, an alkyl silicate, e.g., ethyl silicate, and dimethyldichlorosilane in which the latter is present in an amount ranging up to 25 weight percent of the weight of the trialkyl hydrolyzable silane used to make the methylpolysiloxane copolymer.

The titanium compound suitable for employment in the composition of this invention may be monomeric orthotitanates of the formula $(RO)_4Ti$ or polymers of the orthotitanate having the formula

where R is an alkyl radical which may be saturated or unsaturated and includes methyl, ethyl, propyl, butyl, decyl, undecyl, lauryl, palmityl, oleyl, etc., radicals, and $m$ is an integer greater than 1. Preferably, R is an alkyl radical containing from about 3 to 10 carbon atoms. The alkyl radicals on the oxygen attached to titanium may also have attached thereto hydroxyl or amino radicals so that the titanate contains hydroxylated or amino-substituted aliphatic hydrocarbon radicals. Among such titanium esters may be mentioned, for instance, tetramethyl titanate, tetraethyl titanate, tetrabutyl titanate, tetradecyl titanate, octylene glycol titanate, tetradodecyl titanate, tetra-(hydroxyethyl) titanate, tetra-(hydroxybutyl) titanate, tetra-(amino-ethyl) titanate, tetra-(methylaminobutyl) titanate, etc. Methods for preparing such titanates are found described in U.S. Patent 2,672,455, issued March 16, 1954. Titanium esters wherein R is the same or mixed radicals are likewise suitable.

Partially hydrolyzed compounds of the aforesaid class of orthotitanates obviously also may be used and preferably one employs particularly those partial hydrolyzates which are soluble in the solvents and the gaseous propellants which are to be used in the aerosol container. Additional examples of polymeric organotitanates which may also be used are, e.g., polymers of tetraorgano derivatives of orthotitanic acid, including the tetra esters, tetra anhydrides, and tetra amides, many examples of which are described in U.S. 2,769,732, issued November 6, 1956.

The methyl chlorophenyl organopolysiloxane having the formula

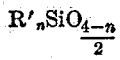

where R' is a member selected from the class consisting of lower alkyl radicals (e.g., methyl and ethyl radicals) and chlorinated phenyl radicals, in which the chlorinated phenyl radicals contain an average of from 3 to 5 chlorine atoms per phenyl nucleus and the chlorinated phenyl radicals constitute from 5 to 25 percent of the total number of lower alkyl and chlorophenyl radicals, and $n$ has an average value of above 1.96 and below 2.5, may be prepared by various methods. One method for preparing these compositions comprises cohydrolyzing, in the proper proportions, trimethylchlorosilane, dimethyldichlorosilane (or diethyldichlorosilane), and chlorinated phenyltrichlorosilane. Thus, on a weight basis, one may employ from 1 to 9 percent trimethylchlorosilane, from 75 to 95 percent dimethyldichlorosilane, and from about 3 to 15 percent chlorinated phenyltrichlorosilane. Alternatively, one may use mixtures of chlorosilanes in which the chlorophenyl group attached to silicon has a methyl or ethyl group attached directly to the same silicon, for instance, methyl trichlorophenyldichlorosilane, methyl tetrachlorophenyldichlorosilane, methyl tetrachlorophenyldiethoxysilane, ethyl tetrachlorophenyldichlorosilane, etc. Higher chlorinated phenylchlorosilanes or other hydrolyzable silanes, such as pentachlorophenyltrichlorosilane, may be used without departing from the scope of the invention. The presence of certain triorganosiloxane units such as trimethylsiloxy units, or monomethylsiloxy units, is not precluded. The proportions of the hydrolyzable ingredients should be such in making the lower alkyl chlorophenylpolysiloxane that the ratio of total lower alkyl groups and chlorinated phenyl radicals ranges from above 1.96, preferably at least 1.98, to below 2.5 of these radicals per silicon atom, and the chlorinated phenyl radicals constitute from 5 to 25 percent of the total number of lower alkyl and chlorophenyl radicals. For optimum use, as water-repellent, and in the form of an aerosol composition, the lower alkyl chlorophenylpolysiloxane fluid should have a viscosity of from 10 to 100,000 centistokes when measured at 25° C.

It will, of course, be apparent to those skilled in the art that in addition to the methylchlorosilanes and ethylchlorosilanes described above, other hydrolyzable lower alkyl silanes containing hydrolyzable groups other than the chlorine atom may be used. The presence of, for instance, methyltrichlorosilane or other lower alkyl trihydrolyzable silanes, or of trimethylchlorosilane or other trisubstituted lower alkyl monochlorosilanes in preparing the lower alkyl, e.g., methyl chlorophenylpolysiloxane is not precluded, as long as the value of $n$ remains substantially in the specified range.

The titanate, methylpolysiloxane resinous copolymer and the lower alkyl chlorophenylpolysiloxane are advantageously mixed with a suitable solvent for the mixture of ingredients, for instance, a Stoddard solvent which is an aliphatic hydrocarbon solvent comprising a petroleum distillate, of which at least 50% distills below 350° F. and essentially all of the material distills up to 410° F., or mineral spirits, and thereafter combined with a liquefied gas which will be used as the propellant for the mixture of polysiloxanes and the titanate. These liquefied gases or propellants are volatile liquid carriers which are a solvent for the ingredients mentioned above, specifically the titanate, the methylpolysiloxane copolymer, and the lower alkyl chlorophenylpolysiloxane. They normally have a vapor pressure at 70° F. exceeding 20 lb./sq. in. gauge and are able to induce expulsion of the above mixture of titanate and organopolysiloxanes in extremely small average particle size, preferably within the range of about 10 to 100 microns. These propellants (which are also sold under the name "Freons" or "Genetrons") are non-toxic, have a high flash point, and are non-inflammable. In general, they are chlorinated, fluorinated alkanes, examples of which are dichlorodifluoromethane, dichlorofluoromethane, chlorodifluoromethane, trichloromonofluoromethane, difluorodichloroethane, etc. Obviously, mixtures of these chlorinated, fluorinated alkanes may also be employed to advantage. More particular directions and examples for using these propellants, particularly the Freon propellants, are found in a booklet issued by E. I. du Pont de Nemours & Company, Wilmington, Delaware, entitled "Package for Profit."

In addition to the propellant, other solvents may be employed, for instance, the above-mentioned mineral spirit, acetone, chlorinated hydrocarbons (e.g., trichloroethylene, ethylene dichloride, etc.), ethers, etc.

When employing the above mixture of ingredients, the proportions are advantageously varied within certain limits. Generally, we prefer that of the mixture of the titanium compound, the methylpolysiloxane copolymer, and the methyl chlorophenylpolysiloxane, on a weight basis, these ingredients comprise from 10 to 60 percent of the titanium compound, from 25 to 75 percent of the methylpolysiloxane copolymer, and from 10 to 50 percent of the methyl chlorophenylpolysiloxane.

When employed in the form of an aerosol bomb mixture, the ingredients are advantageously present, by weight, in the following amounts:

| | Parts |
|---|---|
| Alkyl titanate (which includes polymeric alkyl titanate) | 0.5 to 5 |
| Methylpolysiloxane copolymer | 0.5 to 5 |
| Lower alkyl chlorophenylpolysiloxane | 0.5 to 5 |
| Non-propellant solvent (e.g., mineral spirits) | 5 to 60 |
| Gaseous propellant | 40 to 120 |

We have unexpectedly discovered that even greater improvements in water-repellency may be obtained and better feel and hand of the treated textile realized if, in addition to the titanate, methylpolysiloxane copolymer and methyl chlorophenylpolysiloxane, there is also incorporated in the mixture of ingredients a small amount of a wax, particularly a solid paraffin wax, which is soluble in the solvent as well as in the liquefied propellant. Advantageously, the paraffin wax (or other wax which is used) is preferably present on a weight basis in an amount equal to from 10 to 100 percent or more of the total weight of the alkyl titanate, the methylpolysiloxane copolymer, and the lower alkyl chlorophenylpolysiloxane. The term "paraffin wax" is intended to include waxes melting, for instance, from about 35° to 200° C. or higher, but which are soluble in the solvent used in dissolving the other ingredients, and preferably soluble as well in the liquefied propellant. These are generally high melting hydrocarbons which are constituents of petroleum. They may have the formula $C_xH_{2x+2}$, where $x$ is a value well above 1, for instance, from 18 to 70, or even much higher. Other waxes may be employed, such as beeswax, synthetic hydrocarbon waxes, microcrystalline and oxidized microcrystalline waxes, ceresin wax, Japan wax, halogenated paraffins (e.g., Halowax, etc.), etc. Additional examples of suitable waxes may be found in the book The Chemistry and Technology of Waxes by Albin H. Warth, published by Reinhold Publishing Corporation, New York, N.Y. (2nd edition, 1956).

The spray ratings in the following illustrative examples were determined in accordance with the method set forth in the 1945 Yearbook of the American Association of Textile Chemists and Colorists, volume 22, pages 229–233. A spray rating of 100 is indicative of a textile's ability to shed all drops of water which may have impinged on the surface of a textile upon slight shaking of the textile surface.

In order that those skilled in the art may better understand how the present invention may be practiced, the following examples are given by way of illustration and not by way of limitation. All parts are by weight.

The compositions described in the following examples were tested for their water-repellency on textiles by placing them in aerosol bombs or pressure vessels having a pressure valve nozzle. Unless otherwise stated, the liquefied propellant gases employed were composed of Freon 11 (trichlorofluoromethane) and Freon 12 (dichlorodifluoromethane) in equal parts by weight. In each instance, the cotton material (which was unmodified and untreated cotton cloth) being tested was sprayed evenly on the fabric from an aerosol spray container, and allowed to dry 24 hours before evaluation. Thereafter, each of the treated textile surfaces was then tested for spray ratings, employing the method described in the above-mentioned American Textile Colorist Method.

EXAMPLE 1

A methylpolysiloxane copolymer was prepared by cohydrolyzing 22.4 weight percent trimethylchlorosilane and 77.6 weight percent tetraethyl orthosilicate. The cohydrolysis was carried out in toluene so that the final cohydrolysis product comprised 47 percent solids (in toluene) and the methyl/Si ratio was about 1.07. This polymer will hereinafter be referred to as an "MQ resin."

EXAMPLE 2

A methyl chlorophenylpolysiloxane fluid of about 50 centistokes (when measured at 25° C.) was prepared by cohydrolyzing on a weight basis, 8.5 percent trimethylchlorosilane, 82.5 percent dimethyldichlorosilane, and 9 percent tetrachlorophenyltrichlorosilane. The ratio of the total number of methyl and tetrachlorophenyl groups to silicon was of the order of about 2.06. This linear methyl chlorophenylpolysiloxane fluid (chain-stopped with trimethylsiloxy units) will hereinafter be referred to as "fluid I."

EXAMPLE 3

Another methyl chlorophenylpolysiloxane fluid of about 300 centistokes (when measured at 25° C.) was prepared by cohydrolyzing on a weight basis, 1 percent trimethylchlorosilane, 90 percent dimethyldichlorosilane, and 9 percent tetrachlorophenyltrichlorosilane. This polymer had a ratio of about 1.98 total methyl tetrachlorophenyl radicals per silicon atom. This polymer will hereinafter be referred to as "fluid II."

Aerosol bomb formulations were prepared by placing in a suitable pressure vessel the following ingredients which were present, by weight, as follows, assuming the presence of all the ingredients.

Table I

| Ingredients: | Parts |
|---|---|
| Tetrabutyl titanate | 1.5 |
| Methylpolysiloxane copolymer (as 47% solids toluene solution) | 1.5 |
| Methyl tetrachlorophenylsiloxane fluid | 1.5 |
| Paraffin wax[1] | 40.0 |
| Mineral spirits | 40.0 |
| Freons 11 and 12 (equal parts) | 80.00 |

[1] The paraffin wax used had an analine melting point (A.M.P.) of 133° F. and was a refined grade of petroleum wax manufactured and sold by Gulf Oil Corporation.

In some instances, one or more of the above ingredients were omitted from the aerosol container to determine the effect of such omission.

The following Table II shows the results of spray ratings determined on cotton fabrics in which various combinations of the tetrabutyltitanate, methylpolysiloxane copolymer, methyl tetrachlorophenyl siloxane fluid and paraffin wax were the variables. Where fluids were used, their composition is described below the table. In all the aerosol compositions, the amounts of the mineral spirits and the Freons were constant. The letter "x" indicates the presence of the particular ingredient.

Table II

| Test No. | Tetrabutyl Titanate | MQ Resin | Other Fluid | Paraffin Wax | Spray Rating on Cotton | | |
|---|---|---|---|---|---|---|---|
| 1 | | | | x | 0 | 0 | 0 |
| 2 | x | x | | x | 0 | 0 | 0 |
| 3 | x | | Fluid I | x | 0 | 0 | 0 |
| 4 | | x | do | x | 0 | 0 | 0 |
| 5 | x | x | do | | 100 | 100 | 100 |
| 6 | x | x | Fluid II | | 100 | 100 | 100 |
| 7 | x | x | Fluid I | x | 100 | 100 | 100 |
| 8 | x | x | Fluid II | x | 100 | 100 | 100 |
| 9 | x | x | Fluid III [a] | | Average of three tests—65. | | |
| 10 | x | x | Fluid IV [b] | | 90 | 80 | 95 |
| 11 [c] | Composition commercially available under U.S. 2,672,455. | | | | Average of three tests—less than 50. | | |
| 12 | x | x | Fluid V [d] | | 80 | 80 | 90 |
| 13 | x | x | Fluid VI [e] | | 80 | 80 | 70 |

[a] Fluid III was a linear methyl phenylpolysiloxane fluid of about 120 centistoke viscosity (at 25° C.) chain-stopped with trimethylsiloxy groups and containing both methyl groups and phenyl groups connected directly to silicon in which the phenyl groups were free of any substitution; this composition contained about 25 mol percent phenyl groups.
[b] Fluid IV was a methyl phenylpolysiloxane linear fluid of about 500 centistoke viscosity (at 25° C.) chain-stopped with trimethylsiloxy units in which the phenyl groups were free of substitution; there were present about 40 mol percent silicon-bonded phenyl groups.
[c] This composition, the proportions of whose ingredients were not exactly known, is covered by U.S. Patent 2,672,455 and is sold commercially as a mixture comprising the above-mentioned MQ resin, tetrabutyl titanate, and a linear methylpolysiloxane fluid chain-stopped with trimethylsiloxy units and containing only methyl groups in the linear polysiloxane chain; this composition was made up into an aerosol composition similarly as was done with the others.
[d] Fluid V is a methyl hydrogen polysiloxane fluid of about 25 centistoke viscosity (at 25° C.) chain-stopped with trimethylsiloxy units and containing intermediate

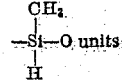

such compositions are more particularly described in Wilcock Patent 2,491,843.
[e] Fluid VI is a mixture of 60 parts of fluid V and 40 parts of a trimethylsiloxy chain-stopped linear methyl polysiloxane of about 25 centistoke viscosity (at 25° C.) containing for the most part dimethylsiloxy units and a small percentage of monomethylsiloxy units (CH$_3$SiO$_{3/2}$).

EXAMPLE 4

For this example, a methylpolysiloxane polymer composed of 1.0 mol trimethylsiloxane units and 1.8 mols SiO$_2$ units, prepared similarly as in Example 1 above, was interacted with a linear polydimethylsiloxane fluid of about 200,000 centipoises viscosity when measured at 145° C., containing terminal silicon-bonded hydroxy units (the said polydimethylsiloxane having the formula

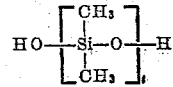

where $t$ is an integer greater than 1). The weight ratio of the reactants was 75 percent of the former and 25 percent, by weight, of the polydimethylsiloxane. The reaction product was now composed of intercondensed trimethylsiloxy units, dimethylsiloxy units, and SiO$_2$ units. This copolymer (hereinafter identified as "MDQ polymer") was made into a water-repellent formulation composed of the following ingredients in the stipulated parts by weight.

| Ingredients: | Parts |
|---|---|
| Tetrabutyltitanate | 9.0 |
| MDQ polymer | 5.5 |
| Fluid I | 5 |
| Paraffin wax | 9 |
| Xylene | 30 |
| Mineral spirits | 72 |
| Freon 11 | 88 |
| Freon 12 | 132 |

Aerosol bombs were prepared from the above mixture of ingredients and applied to cotton, viscous and acetate cloths, by spraying the cloths and allowing them to dry at room temperature for about 16 hours. At the end of this time, the spray ratings of the three cloths were determined and found to be an average of 100 for three samples of each of the treated cloths.

EXAMPLE 5

In this example, another aerosol bomb mixture was prepared from the following ingredients.

| Ingredients: | Parts |
|---|---|
| Tetrabutyltitanate | 9 |
| MDQ polymer | 6.3 |
| Fluid I | 2.7 |
| Paraffin | 9 |
| Mineral spirits | 102 |
| Freon 11 | 84 |
| Freon 12 | 126 |

Rayon gabardine of shades varying from tan to dark brown were sprayed with the above-identified formulation and allowed to air dry for about 16 hours at room temperature. Samples of these materials (which had spray ratings of around 100) were dry cleaned as well as were other samples of the cloth treated with a trimethylsiloxy chain-stopped methyl hydrogen polysiloxane such as fluid V containing a catalyst and heat cured, were dry cleaned and the spray ratings again determined. The samples treated with the methyl hydrogen polysiloxane showed spray ratings of zero with the exception of the dark brown samples which had a spray rating of about 70. In contrast to this, the rayon gabardine samples sprayed and dried at room temperature in accordance with our invention all showed ratings of 70 or above after the spray ratings.

It has been found that on dark fabrics, there may be a tendency for the paraffin or other waxes which may be employed, to cause a slight haze on dark colored fabrics. This tendency toward haziness can be materially reduced and often completely eliminated by incorporating in the aerosol mixture small amounts of such materials as stearic acid or glyceryl monostearate usually in amounts ranging from about 0.5 to 8 percent, by weight, based on the total weight of the ingredients in the aerosol bomb container. Stated alternatively based on the mixture of the organic titanate, the methylpolysiloxane copolymer and the lower alkyl chlorinated phenyl polysiloxane, we can advantageously employ from about 5 to 30 percent, by weight, of these anti-haze ingredients. As an additional advantage of these anti-haze ingredients, freezing or crystallizing out of the wax at the discharge orifice of the aerosol valve is essentially eliminated.

The compositions containing wax in combination with butyl titanate, the methylpolysiloxane copolymer, and the methyl chlorophenylpolysiloxane materially improved the feel of the treated product and, as will be noted above, did not harm the water-repellency. The improvement in feel of the treated cotton fabric was evidenced by a reduction in the slight tackiness of the fabric without the wax present thereon and a material softening of the surface of the treated fabric.

It will, of course, be apparent to those skilled in the art that in addition to the proportions of ingredients described above within the purview of our invention, other proportions of ingredients may be employed, as well as other types of methylpolysiloxane copolymers, titanates, lower alkyl chlorophenylpolysiloxane fluids (including different degrees of chlorine substitutions on the phenyl nucleus), waxes, etc., without departing from the scope of the invention. The proportions of ingredients may be varied widely, as will be apparent from the preceding description of the invention. Other textiles such as nylon, acrylonitrile fibre fabrics, polyester fibre fabrics, wool, rayon, silk, etc., may be treated in accordance with the practice of the present invention to render the same water-repellent and to give the improved results found in the treatment of the cotton textiles.

What we claim as new and desire to secure by Letters Patent of the United States is:

1. A composition of matter comprising, by weight, (1) from 10 to 60 percent of a titanium compound selected from the class consisting of (a) orthotitanates having the general formula Ti(OR)$_4$ where R is a member selected from the class consisting of aliphatic hydrocarbon radicals of less than 12 carbon atoms and hydroxylated and aminated aliphatic hydrocarbon radicals of less than 12 carbon atoms and containing less than four hydroxy radicals, and (b) aliphatic hydrocarbon-soluble partial hydrolyzates of (a), (2) from 25 to 75 percent of a methylpolysiloxane copolymer containing trimethylsiloxy units and SiO$_2$ units wherein said units are in such proportion that the ratio of methyl groups to silicon atoms ranges from about 1 to 1.25 methyl groups per silicon atom, and (3) from 10 to 50 percent of a fluid organopolysiloxane having the formula

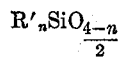

where R' represents both lower alkyl radicals of from 1 to 2 carbon atoms and chlorinated phenyl radicals in which the chlorinated phenyl radicals contain an average of from 3 to 5 chlorine atoms per phenyl nucleus, and the chlorinated phenyl radicals constitute from 5 to 25 percent of the total number of lower alkyl and chlorophenyl radicals, and $n$ has an average value of between 1.96 to 2.5, the organopolysiloxane fluid having a viscosity of from 10 to 100,000 centistokes when measured at 25° C.

2. A composition of matter comprising, by weight, (1) from 10 to 60 percent of a titanium compound selected from the class consisting of (a) orthotitanates having the general formula Ti(OR)$_4$ where R is a member selected from the class consisting of aliphatic hydrocarbon radicals of less than 12 carbon atoms and hydroxylated and aminated aliphatic hydrocarbon radicals of less than 12 carbon atoms and containing less than four hydroxy radicals, and (b) aliphatic hydrocarbon-soluble partial hydrolyzates of (a), (2) from 25 to 75 percent of a methylpolysiloxane copolymer containing trimethylsiloxy units, dimethylsiloxy units and SiO$_2$ units wherein said units are in such proportion that the ratio of methyl groups to silicon atoms ranges from about 1 to 1.25 methyl groups per silicon atom, and (3) from 10 to 50 percent of a fluid organopolysiloxane having the formula

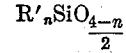

where R' represents both lower alkyl radicals of from 1 to 2 carbon atoms and chlorinated phenyl radicals in which the chlorinated phenyl radicals contain an average of from 3 to 5 chlorine atoms per phenyl nucleus, and the chlorinated phenyl radicals constitute from 5 to 25 percent of the total number of lower alkyl and chlorophenyl radicals, and $n$ has an average value of between 1.96 to 2.5, the organopolysiloxane fluid having a viscosity of from 10 to 100,000 centistokes when measured at 25° C.

3. A composition as in claim 1 in which the fluid organopolysiloxane is a methyl chlorophenylpolysiloxane.

4. A composition of matter comprising, by weight, (1) from 10 to 60 percent of an orthotitanate having the general formula Ti(OR)$_4$ where R is a member selected from the class consisting of aliphatic hydrocarbon radicals of less than 12 carbon atoms and hydroxylated and aminated aliphatic hydrocarbon radicals of less than 12 carbon atoms and containing less than four hydroxy radicals, (2) from 25 to 75 percent of a methylpolysiloxane copolymer containing trimethylsiloxy units and SiO$_2$ units wherein said units are in such proportion that the ratio of methyl groups to silicon atoms ranges from about 1 to 1.25 methyl groups per silicon atom, and (3) from 10 to 50 percent of a fluid organopolysiloxane having the formula $$R'_n SiO_{\frac{4-n}{2}}$$

where R' represents both methyl and chlorinated phenyl radicals in which the chlorinated phenyl radicals contain an average of from 3 to 5 chlorine atoms per phenyl nucleus, and the chlorinated phenyl radicals constitute from 5 to 25 percent of the total number of methyl and chlorophenyl radicals, and n has an average value of between 1.96 to 2.5, the organopolysiloxane fluid having a viscosity of from 10 to 100,000 centistokes when measured at 25° C.

5. A composition of matter comprising, by weight, (1) from 10 to 60 percent of a titanium compound selected from the class consisting of (a) orthotitanates having the general formula Ti(OR)$_4$ where R is a member selected from the class consisting of aliphatic hydrocarbon radicals of less than 12 carbon atoms and hydroxylated and aminated aliphatic hydrocarbon radicals of less than 12 carbon atoms and containing less than four hydroxy radicals, and (b) aliphatic hydrocarbon-soluble partial hydrolyzates of (a), (2) from 25 to 75 percent of a methylpolysiloxane copolymer containing trimethylsiloxy units and SiO$_2$ units wherein said units are in such proportion that the ratio of methyl groups to silicon atoms ranges from about 1 to 1.25 methyl groups per silicon atom, (3) from 10 to 50 percent of a fluid organopolysiloxane having the formula $$R'_n SiO_{\frac{4-n}{2}}$$

where R' represents both lower alkyl radicals of from 1 to 2 carbon atoms and chlorinated phenyl radicals in which the chlorinated phenyl radicals contain an average of from 3 to 5 chlorine atoms per phenyl nucleus, and the chlorinated phenyl radicals constitute from 5 to 25 percent of the total number of lower alkyl and chlorophenyl radicals, and n has an average value of between 1.96 and 2.5, the organopolysiloxane fluid having a viscosity of from 10 to 10,000 centistokes when measured at 25° C., and (4) a volatile fluorinated alkane carrier.

6. A composition of matter comprising, by weight, (1) from 10 to 60 percent of an orthotitanate having the general formula Ti(OR)$_4$ where R is a member selected from the class consisting of aliphatic hydrocarbon radicals of less than 12 carbon atoms and hydroxylated and aminated aliphatic hydrocarbon radicals of less than 12 carbon atoms and containing less than four hydroxy radicals, (2) from 25 to 75 percent of a methylpolysiloxane copolymer containing trimethylsiloxy units and SiO$_2$ units wherein said units are in such proportion that the ratio of methyl groups to silicon atoms ranges from about 1 to 1.25 methyl groups per silicon atom, (3) from 10 to 50 percent of a fluid organopolysiloxane having the formula $$R'_n SiO_{\frac{4-n}{2}}$$

where R' represents both methyl and chlorinated phenyl radicals in which the clorinated phenyl radicals contain an average of from 3 to 5 chlorine atoms per phenyl nucleus, and the chlorinated phenyl radicals constitute from 5 to 25 percent of the total number of methyl and chlorophenyl radicals, and n has an average value of between 1.96 to 2.5, the organopolysiloxane fluid having a viscosity of from 10 to 100,000 centistokes when measured at 25° C., and (4) a volatile fluorinated alkane carrier.

7. A composition of matter comprising, by weight, (1) from 10 to 60 percent butyl titanate, (2) from 25 to 75 percent of a methylpolysiloxane copolymer containing trimethylsiloxy units and SiO$_2$ units wherein said units are in such proportion that the ratio of methyl groups to silicon atoms ranges from about 1 to 1.25 methyl groups per silicon atom, (3) from 10 to 50 percent of a fluid organopolysiloxane having the formula $$R'_n SiO_{\frac{4-n}{2}}$$

where R' represents both methyl and chlorinated phenyl radicals in which the chlorinated phenyl radicals contain an average of from 3 to 5 chlorine atoms per phenyl nucleus, and the chlorinated phenyl radicals constitute from 5 to 25 percent of the total number of methyl and chlorophenyl radicals, and n has an average value of between 1.96 and 2.5, the organopolysiloxane fluid having a viscosity of from 10 to 100,000 centistokes when measured at 25° C., and (4) a volatile fluorinated alkane carrier.

8. A composition of matter comprising, by weight, (1) from 10 to 60 percent of a titanium compound selected from the class consisting of (a) orthotitanates having the general formula Ti(OR)$_4$ where R is a member selected from the class consisting of aliphatic hydrocarbon radicals of less than 12 carbon atoms and hydroxylated and aminated aliphatic hydrocarbon radicals of less than 12 carbon atoms and containing less than four hydroxy radicals, and (b) aliphatic hydrocarbon-soluble partial hydrolyzates of (a), (2) from 25 to 75 percent of a methylpolysiloxane copolymer containing trimethylsiloxy units and SiO$_2$ units wherein said units are in such proportion that the ratio of methyl groups to silicon atoms ranges from about 1 to 1.25 methyl groups per silicon atom, (3) from 10 to 50 percent of a fluid organopolysiloxane having the formula $$R'_n SiO_{\frac{4-n}{2}}$$

where R' represents both lower alkyl radicals of from 1 to 2 carbon atoms and chlorinated phenyl radicals in which the chlorinated phenyl radicals contain an average of from 3 to 5 chlorine atoms per phenyl nucleus, and the chlorinated phenyl radicals constitute from 5 to 25 percent of the total number of lower alkyl and chlorophenyl radicals, and n has an average value of between 1.96 and 2.5, the organopolysiloxane fluid having a viscosity of from 10 to 100,000 centistokes when measured at 25° C., and (4) a wax selected from the class consisting of beeswax, synthetic hydrocarbon waxes, paraffin wax, microcrystalline waxes, oxidized microcrystalline waxes, ceresin wax, Japan wax, and halogenated paraffin waxes.

9. A composition of matter comprising, by weight, (1) from 10 to 60 percent of an orthotitanate having the general formula Ti(OR)$_4$ where R is a member selected from the class consisting of aliphatic hydrocarbon radicals of less than 12 carbon atoms and hydroxylated and aminated aliphatic hydrogen radicals of less than 12 carbon atoms and containing less than four hydroxy radicals, (2) from 25 to 75 percent of a methylpolysiloxane copolymer containing trimethylsiloxy units and SiO$_2$ units wherein said units are in such proportion that the ratio of methyl groups to silicon atoms ranges from about 1 to 1.25 methyl groups per silicon atom, (3) from 10 to 50 percent of a fluid organopolysiloxane having the formula $$R'_n SiO_{\frac{4-n}{2}}$$

where R' represents both methyl and chlorinated phenyl radicals in which the chlorinated phenyl radicals contain an average of from 3 to 5 chlorine atoms per phenyl nucleus, and the chlorinated phenyl radicals constitute from 5 to 25 percent of the total number of methyl and chlorophenyl radicals, and n has an average value of between 1.96 and 2.5, the methyl chlorophenylpolysiloxane fluid having a viscosity of from 10 to 10,000 centistokes when measured at 25° C., and (4) a wax selected from the class consisting of beeswax, synthetic hydrocarbon waxes, paraffin waxes, microcrystalline waxes, oxidized microcrystalline waxes, ceresin wax, Japan wax, and halogenated paraffin waxes.

10. A composition of matter comprising, by weight, (1) from 10 to 60 percent butyl titanate, (2) from 25 to 75 percent of a methylpolysiloxane copolymer containing trimethylsiloxy units and $SiO_2$ units wherein said units are in such proportion that the ratio of methyl groups to silicon atoms ranges from about 1 to 1.25 methyl groups per silicon atom, (3) from 10 to 50 percent of a fluid organopolysiloxane having the formula $$R'_n SiO_{\frac{4-n}{2}}$$

where R' represents both methyl and chlorinated phenyl radicals in which the chlorinated phenyl radicals contain an average of from 3 to 5 chlorine atoms per phenyl nucleus, and the chlorinated phenyl radicals constitute from 5 to 25 percent of the total number of methyl and chlorophenyl radicals, and $n$ has an average value of between 1.96 and 2.5, the organopolysiloxane fluid having a viscosity of from 10 to 100,000 centistokes when measured at 25° C., (4) a volatile fluorinated alkane carrier, and (5) a wax selected from the class consisting of beeswax, synthetic hydrocarbon waxes, paraffin waxes, microcrystalline waxes, oxidized microcrystalline waxes, ceresin wax, Japan wax, and halogenated paraffin waxes.

11. A composition of matter comprising, by weight, (1) from 10 to 60 percent butyl titanate, (2) from 25 to 75 percent of a methylpolysiloxane copolymer containing trimethylsiloxy units and $SiO_2$ units wheerin said units are in such proportion that the ratio of methyl groups to silicon atoms ranges from about 1 to 1.25 methyl groups per silicon atom, (3) from 10 to 50 percent of a fluid organopolysiloxane having the formula $$R'_n SiO_{\frac{4-n}{2}}$$

where R' represents both methyl and chlorinated phenyl radicals in which the chlorinated phenyl radicals contain an average of from 3 to 5 chlorine atoms per phenyl nucleus, and the chlorinated phenyl radicals constitute from 5 to 25 percent of the total number of methyl and chlorophenyl radicals, and $n$ has an average value of between 1.96 and 2.5, the organopolysiloxane fluid having a viscosity of from 10 to 100,000 centistokes when measured at 25° C., (4) a volatile fluorinated alkane carrier, (5) a wax selected from the class consisting of beeswax, synthetic hydrocarbon waxes, paraffin waxes, microcrystalline waxes, oxidized microcrystalline waxes, ceresin wax, Japan wax, and halogenated paraffin waxes, and (6) a volatile hydrocarbon solvent.

12. A composition of matter comprising, by weight, (1) from 10 to 60 percent tetrabutyl titanate, (2) from 25 to 75 percent of a methylpolysiloxane copolymer containing trimethylsiloxy units and $SiO_2$ units wherein said units are in such proportion that the ratio of methyl groups to silicon atoms ranges from about 1 to 1.25 methyl groups per silicon atom, (3) from 10 to 50 percent of a fluid methyl chlorophenylpolysiloxane wherein the chlorinated phenyl radicals contain an average of from 3 to 5 chlorine atoms per phenyl nucleus and the chlorinated phenyl radicals constitute from 5 to 25 percent of the total number of silicon-bonded methyl and chlorophenyl radicals, there being an average of between 1.96 and 2.5 total methyl and chlorophenyl radicals per silicon atom, the said methyl chlorophenylpolysiloxane fluid having a viscosity of from 10 to 100,000 centistokes when measured at 25° C., (4) paraffin wax, (5) a fluorinated alkane volatile carrier, and (6) a volatile hydrocarbon solvent.

References Cited in the file of this patent

UNITED STATES PATENTS

| Re. 23,879 | Currie | Sept. 28, 1954 |
| 2,258,219 | Rochow | Oct. 7, 1951 |
| 2,757,152 | Solomon | July 31, 1956 |